US012791522B2

(12) United States Patent
Zhu et al.

(10) Patent No.: US 12,791,522 B2
(45) Date of Patent: Nov. 10, 2026

(54) NON-INVASIVE LIQUID DETECTION METHOD BASED ON ACOUSTIC WAVE FEATURES AND APPARATUS THEREOF

(71) Applicant: The Hong Kong Polytechnic University Shenzhen Research Institute, Shenzhen (CN)

(72) Inventors: Juncen Zhu, Shenzhen (CN); Jiannong Cao, Shenzhen (CN); Yanni Yang, Shenzhen (CN)

(73) Assignee: The Hong Kong Polytechnic University Shenzhen Research Institute, Shenzhen (CN)

( * ) Notice: Subject to any disclaimer, the term of this patent is extended or adjusted under 35 U.S.C. 154(b) by 377 days.

(21) Appl. No.: 18/539,503

(22) Filed: Dec. 14, 2023

(65) Prior Publication Data

US 2024/0302325 A1 Sep. 12, 2024

(30) Foreign Application Priority Data

Mar. 7, 2023 (CN) ......................... 202310256153.1

(51) Int. Cl.
*G01N 29/036* (2006.01)
*G01N 29/44* (2006.01)

(52) U.S. Cl.
CPC ....... *G01N 29/036* (2013.01); *G01N 29/4418* (2013.01); *G01N 29/4481* (2013.01)

(58) Field of Classification Search
CPC .. G01N 29/032; G01N 29/036; G01N 29/348; G01N 29/4418; G01N 29/4481;
(Continued)

(56) References Cited

U.S. PATENT DOCUMENTS 10,705,017 B2 * 7/2020 Muldoon ............... G01N 21/65
2021/0262963 A1 * 8/2021 Panchalan ................ G06N 3/09

FOREIGN PATENT DOCUMENTS

CN 103487506 A * 1/2014
CN 113330185 A * 8/2021 ............... G06N 7/01
(Continued)

OTHER PUBLICATIONS

Yang et al., "HearLiquid: Non-intrusive Liquid Fraud Detection Using Commodity Acoustic Devices", Journal of Latex Class Files, IEEE Internet of Things Journal, IEEE, Jan. 2022, vol. 9, No. 15, 15 pages.

*Primary Examiner* — Octavia Hollington
(74) *Attorney, Agent, or Firm* — Maier & Maier, PLLC

(57) ABSTRACT

A non-invasive liquid detection method based on acoustic wave features and an apparatus thereof, the method includes: collecting acoustic waves penetrating a liquid to be tested and extracting acoustic absorption-transmission curve features from the acoustic waves to generate a liquid fingerprint, the acoustic absorption-transmission curve features represent a ratio of an energy of an acoustic signal penetrating the liquid to an energy of an acoustic signal emitted across a plurality of frequencies; inputting the liquid fingerprint into a trained neural network model for detection processing, and outputting detection results. The neural network model is trained with a plurality of sets of data, and each set of data includes: acoustic absorption-transmission curve features, and a label identifying a feature that meets a detection requirement in the acoustic absorption-transmission curve features.

8 Claims, 2 Drawing Sheets

(58) Field of Classification Search
CPC ............. G01N 29/46; G01N 2291/014; G01N 2291/022
See application file for complete search history.

(56) References Cited

FOREIGN PATENT DOCUMENTS

| | | | | | |
|---|---|---|---|---|---|
| CN | 113984741 | A | * | 1/2022 | ............. G01N 21/75 |
| DE | 102020108063 | A1 | * | 5/2020 | ............. G01N 29/46 |
| WO | WO-9839648 | A1 | * | 9/1998 | ............. G01N 33/14 |

* cited by examiner

NON-INVASIVE LIQUID DETECTION METHOD BASED ON ACOUSTIC WAVE FEATURES AND APPARATUS THEREOF

CROSS-REFERENCE TO RELATED APPLICATIONS

The present application claims priority to Chinese Patent Application No. 202310256153.1, filed on Mar. 7, 2023, the content of all of which is incorporated herein by reference.

FIELD

The present disclosure relates to the technical field of liquid product quality inspection, in particular to a non-invasive liquid inspection method based on acoustic wave features and an apparatus thereof.

BACKGROUND

Liquid products such as liquor and condiments may face quality issues such as expiration and counterfeiting due to prolonged storage or fraudulent production. The presence of counterfeit products circulating widely in the market poses risks to various parties, potentially leading to food safety crisis. Common quality problems in liquid products include counterfeiting, shoddy and expiration. Due to the high cost of testing equipment, elevated testing expenses, complexity in testing indicators, as well as limitations in testing conditions and applicable products, manufacturers and merchants are unable to guarantee the product quality of all ex-factory goods, and it is also difficult for individual buyers to assess the quality levels of the purchased products.

The existing liquid product quality testing methods, according to different detection technologies, can be divided into four categories: chemical and chromatographic detection, quasi-static electron chromatography imaging detection, liquid surface tension detection and radiofrequency signal detection. Among them, biochemical tool detection and liquid surface tension measurement require expensive equipment, and involve destroying the commodity packaging to come into direct contact with the liquid, which is not conducive to the sale of liquid commodities; quasi-static electron chromatography imaging detection can only detect a single indicator, that is, whether the liquid is flammable or explosive, and cannot detect other quality issues of the liquid products; radiofrequency signal detection allows for non-invasive detection of the quality of the liquid products, but the equipment required is bulky and expensive and cannot detect products in metal containers.

Therefore, the current liquid product quality detection faces the problem that high-precision detection leads to products damaging, while non-invasive detection encounters issues of low accuracy, significant limitations, and high detection costs. Consequently, the existing technology needs to be improved and developed.

SUMMARY

In view of the above deficiencies of the prior art, the purpose of the present disclosure is to provide a non-invasive liquid detection method based on acoustic wave features and an apparatus thereof, to solve the problem that in the current liquid product quality detection, high-precision detection leads to products damaging, and non-invasive detection encounters the issues of low accuracy, significant limitations, and high detection cost.

The technical solution of the present disclosure is as follows:

A method for non-invasive liquid detection based on acoustic wave features, the method comprises:

- collecting acoustic waves penetrating a liquid to be tested, and extracting acoustic absorption-transmission curve features from the acoustic waves to generate a liquid fingerprint, wherein the acoustic absorption-transmission curve features represent a ratio of an energy of an acoustic signal penetrating the liquid to an energy of an acoustic signal emitted across a plurality of frequencies;
- inputting the liquid fingerprint into a trained neural network model for detection processing, and outputting detection results, wherein the neural network model is trained with a plurality of sets of data, and each set of data in the plurality of sets of data comprises: acoustic absorption-transmission curve features, and a label identifying a feature that meets a detection requirement in the acoustic absorption-transmission curve features.

Optionally, the step of collecting acoustic waves penetrating the liquid to be tested, and extracting acoustic absorption-transmission curve features from the acoustic waves to generate a liquid fingerprint includes:

- collecting acoustic waves penetrating the liquid to be tested, and pre-processing the acoustic waves to obtain an acoustic wave signal with background noise removed;
- performing a fast Fourier transform on the processed acoustic wave signal and extracting a frequency domain amplitude at each frequency;
- dividing the frequency domain amplitude by a corresponding amplitude in a spectrum to obtain the acoustic absorption-transmission curve features.

Optionally, in the step of collecting acoustic waves penetrating the liquid to be tested, and pre-processing the acoustic waves to obtain an acoustic signal with background noise removed:

- pre-processing the collected acoustic waves by a high-pass filter with a cutoff frequency of 18 kHz to remove the background noise.

Optionally, before the step of performing a fast Fourier transform on the processed acoustic wave signal and extracting a frequency domain amplitude at each frequency, the method further comprises:

- processing the acoustic wave signal with background noise removed by a hamming window function.

Optionally, in the step of inputting the liquid fingerprint into a trained neural network model for detection processing, and outputting detection results:

- in the neural network model, the acoustic absorption-transmission curve features obtained in different containers are processed by a frequency-sensitive regularizer and a variational autoencoder to obtain a standard acoustic absorption-transmission curve feature of the liquid to be tested.

Optionally, in the step of inputting the liquid fingerprint into a trained neural network model for detection processing, and outputting detection results:

- the neural network model comprises a 5-layer fully connected neural network having 32 neurons in each layer of the neural network.

Optionally, before the step of inputting the liquid fingerprint into the trained neural network model for detection processing, and outputting the detection result, the method further includes:

selecting a corresponding neural network model according to a received detection instruction; wherein:

the detection instruction includes verifying an authenticity of liquor;

each set of data for training the neural network model includes: acoustic absorption-transmission curve features, and a label identifying a feature in the acoustic absorption-transmission curve features related to the liquor is genuine;

or the detection instruction includes detecting a category of liquid;

each set of data for training the neural network model includes: acoustic absorption-transmission curve features, and a label identifying the category of liquid in the acoustic absorption-transmission curve features;

or the detection instruction includes detecting a quality of liquid;

each set of data for training the neural network model includes: acoustic absorption-transmission curve features, and a label identifying the quality of the liquid in the acoustic absorption-transmission curve features.

In another aspect, the present application also provides a non-invasive liquid detection apparatus based on acoustic features, comprising: a base, a sound outputting section, provided on the base for emitting sound;

a sound receiving section, provided on the base and set opposite to the sound outputting section, between the sound receiving section and the sound outputting section liquid to be tested is placed, and the sound receiving section is configured to receive sound waves penetrating the liquid to be tested; and a control computing component, the control computing component is electrically connected to the sound outputting section and the sound receiving section, and is configured to perform the non-invasive liquid detection method based on acoustic wave features as described above.

Optionally, the base comprises: a base plate;

a movable section, the movable section is movably provided on the base plate in a first predetermined direction by a slide guide assembly, and the sound receiving section is provided on the movable section;

a fixed section, the fixed section is fixedly provided on the base plate and spaced apart from the movable section, the sound outputting section is provided on the fixed section; and an adjustment limit member, the adjustment limit member is configured to fix the movable section after position adjustment.

Optionally, the control computing assembly comprises:

a display and control panel, the display and control panel is provided on the base;

a computing unit, the computing unit is provided on the base and electrically connected to the display and control panel.

Beneficial effect: Compared with the prior art, the present disclosure proposes a non-invasive liquid detection method and apparatus based on acoustic wave features, in which acoustic wave features are collected using acoustic waves penetrating a container of the liquid to be tested, and acoustic absorption-transmission curve features are extracted as a liquid fingerprint, wherein the acoustic absorption-transmission curve features represent the ratio of the energy of the acoustic signal passing through the liquid to the energy of the acoustic signal emitted across a plurality of frequencies, and such acoustic absorption-transmission curve features have different manifestations for liquid having different qualities, and the liquid fingerprint formed based on the features of the liquid provides high accuracy. The liquid fingerprint database is constructed based on multiple acoustic absorption-transmission curve features of different liquids or different qualities of the same liquid. By utilizing neural networks for liquid fingerprint feature learning, training the required neural network model, and subsequently employing the trained neural network model instead of liquid detection when detecting the liquid, thus the cost for quality detection is significant reduced and the accuracy of detection is enhanced. At the same time, the liquid quality detection based on the acoustic absorption-transmission curve features eliminates the need to destroy the commodity packaging to access the liquid. Moreover, the material limitations of the liquid containers are overcome, enabling the detection of liquid commodities in containers made of various materials such as plastic, glass, metal and other materials, which can satisfy the diverse detection needs of enterprises, merchants and individual buyers. Therefore, the present application can meet the three major requirements of liquid product quality detection, i.e., non-destructive testing, high accuracy and low cost. The present application addresses various detection scenarios, thus improving the economic benefits of liquid product production and sales from the perspective of liquid product testing, and ensuring food safety of liquid products.

DETAILED DESCRIPTION OF EMBODIMENTS

The present disclosure provides a non-invasive liquid detection method based on acoustic wave features and an apparatus, and in order to make the purpose, technical solution and effect of the present disclosure clearer and more explicit, the present disclosure is described in optional detail hereinafter with reference to the accompanying drawings and by way of examples. It should be understood that the specific embodiments described herein are only for explaining the present disclosure and are not intended to limit the present disclosure.

Embodiment I

Figure 1:
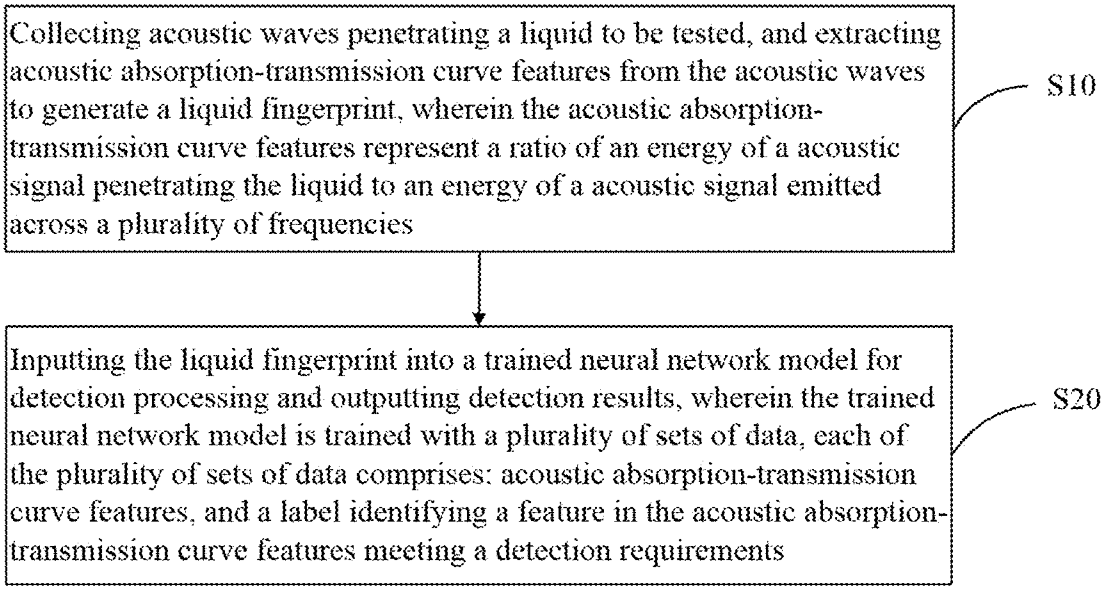
FIG. 1 shows a flow block diagram of the main steps of a non-invasive liquid detection method based on acoustic wave features of the present disclosure.

As shown in FIG. 1, this embodiment proposes a non-invasive acoustic wave feature-based liquid detection method, which can detect liquids contained in different containers, the containers can be plastic, glass, ceramic, metal, etc., and can detect whether the liquids are counterfeited, counterfeit or expired, etc. The non-invasive liquid detection method based on acoustic wave features mainly includes the following steps:

Step S10: Collecting acoustic waves penetrating a liquid to be tested, and extracting acoustic absorption-transmission curve features from the acoustic waves to generate a liquid fingerprint.

Sound is generated through a loudspeaker so that the sound penetrates through the container containing the liquid to be measured, and then the penetrated sound is collected through a microphone, and the frequency domain amplitude at each frequency is extracted from the collected sound. Then, the frequency domain amplitude is divided by the corresponding amplitude in the frequency spectrum to obtain the acoustic absorption-transmission curve characteristic. Thus, the acoustic absorption-transmission curve characteristic represents the ratio of the energy of the acoustic signal after passing through the liquid to the energy of the acoustic signal emitted across the plurality of frequencies. In practice, the volume of the loudspeaker and the microphone may vary, and therefore the acoustic absorption-transmission curve characteristic is calibrated for different volumes of sound emitted, and the acoustic absorption-transmission curve characteristic is normalized to the characteristic at the same scale. In this way, different properties of the liquid can be exhibited based on the acoustic absorption-transmission curve features even at different emitted sound volumes.

Step S20: Inputting the liquid fingerprint into a trained neural network model for detection processing and outputting detection results.

The neural network model may use a basic neural network model, which is trained by a plurality of sets of data in the constructed liquid fingerprint database, so that the neural network model is trained by a plurality of sets of data, and each of the plurality of sets of data comprises: acoustic absorption-transmission curve features, and a label identifying a feature that meets the detection requirements in that acoustic absorption-transmission curve features.

The trained neural network model recognizes the acoustic absorption-transmission curve features of the input liquid to be detected and determines whether or not it meets the detection requirements, such as whether or not it is a counterfeit alcohol or drug, whether or not it is an expired product, or whether or not it determines what kind of liquid it is.

In the present embodiment, an acoustic feature is acquired using sound waves after penetrating a container of the liquid under test, and an acoustic absorption-transmission curve feature is extracted as a liquid fingerprint, wherein the acoustic absorption-transmission curve feature represents the ratio of the energy of an acoustic signal after passing through the liquid to the energy of an acoustic signal emitted across a plurality of frequencies, such that the acoustic absorption-transmission curve features have different expressions for liquids of different qualities. Liquid fingerprints based on this liquid characteristic are highly accurate. Based on the multiple acoustic absorption-transmission curve features of different liquids or different qualities of the same liquid, a liquid fingerprint database is constructed. Through the use of neural networks to learn the features of the liquid fingerprint, the required neural network model is trained, and then when the liquid is detected, the trained neural network model is directly used as a substitute for the liquid detection technology, which greatly reduces the cost of quality inspection and improves the accuracy of the inspection. At the same time, based on the acoustic absorption-transmission curve features of the liquid quality detection without destroying the commodity packaging contact liquid, and can break through the material limitations of the liquid containers, detection of plastic, glass, metal and other materials containers of liquid commodities, to meet the diversified needs of enterprises, merchants and individual buyers of the detection.

Figure 2:
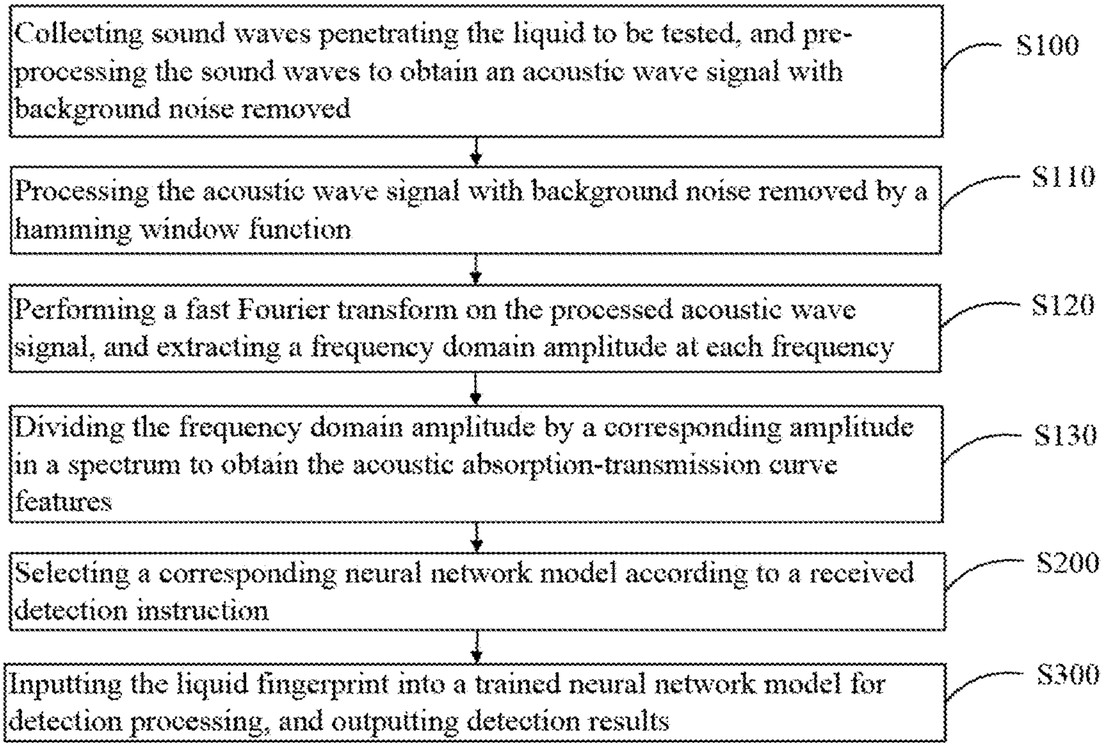
FIG. 2 shows a flow block diagram of specific steps of a non-invasive liquid detection method based on acoustic wave features of the present disclosure.

As shown in FIG. 2, specific steps in this embodiment include:

Step S100: Collecting sound waves penetrating the liquid to be tested, and pre-processing the sound waves to obtain an acoustic wave signal with background noise removed.

In the specific process, a high-pass filter with a cut-off frequency of 18 kHz is applied to the acquired acoustic wave signals, so that the useful letter acoustic wave signals are clear and the useless signals are filtered out to remove the background noise.

Step S110: Processing the acoustic wave signal with background noise removed by a hamming window function.

The filtered signal is processed through the hamming window function to reduce frequency leakage and make the acoustic wave signal fidelity.

Step S120: Performing a fast Fourier transform on the processed acoustic wave signal, and extracting a frequency domain amplitude at each frequency.

Step S130: Dividing the frequency domain amplitude by a corresponding amplitude in a spectrum to obtain the acoustic absorption-transmission curve features.

The frequency domain amplitude at each frequency is extracted by performing a fast Fourier transform on the filtered signal through the above steps. The frequency domain amplitude is divided by the corresponding amplitude in the frequency spectrum to arrive at the acoustic absorption-transmission curve features. The acoustic absorption-transmission curve features represent the ratio of the energy of the remaining acoustic signal to the energy of the acoustic signal emitted across the plurality of frequencies, which can accurately represent the features of the liquid passed through and realize feature extraction.

Step S200: Selecting a corresponding neural network model according to a received detection instruction.

Since the neural network model is trained with a plurality of sets of data, each of the plurality of sets of data comprises: acoustic absorption-transmission curve features and a label identifying a feature in the acoustic absorption-transmission curve features that meets the detection requirements. Thus, the training data uses different labels identifying the features in that acoustic absorption-transmission curve features that meet the detection requirements, and different neural network models can be trained by the underlying neural network model. Since the detection of liquids in the present solution includes: the detection of the truth of liquids, the detection of the type of liquids, and the detection of the quality of liquids, the labels identifying the features in the acoustic absorption-transmission curve features in which the liquor is genuine, the labels identifying the type of liquids in the acoustic absorption-transmission curve features, and the labels identifying the quality of the liquids in the acoustic absorption-transmission curve features are set up in the training data, so as to train the neural networks with different weights.

In the specific process, if the received instruction is to detect the authenticity of the alcoholic beverage, then a neural network model with corresponding weights is selected, and each set of data for training the neural network model comprises: the acoustic absorption-transmission curve features, and the label identifying the feature of the acoustic absorption-transmission curve features in which the alcoholic beverage is authentic.

If the received instruction is to detect a category of liquid; then a neural network model with corresponding weights is selected, and each set of data on which the neural network model is trained includes: acoustic absorption-transmission curve features, and a label identifying the category of liquid in the acoustic absorption-transmission curve features.

If the received instruction is to detect a quality of the liquid; then a neural network model with corresponding weights is selected, and each set of data for training the neural network model includes: acoustic absorption-transmission curve features, and a label identifying the quality of the liquid in the acoustic absorption-transmission curve features.

The selection of the neural network model with the corresponding weights for different detection features corresponds to more accurate detection results.

The neural network model in this embodiment includes a 5-layer fully connected neural network with 32 neurons in each layer of the neural network. The use of this neural network model improves the model complexity as well as improves the nonlinear expression ability of the model, thereby improving the learning ability of the model. For example, when testing the quality of a liquid, the acoustic absorption-transmission curve features of the tested liquid are first obtained, and then the deterioration level of the liquid is obtained in an intrusive way. The acoustic absorption-transmission curve features are then used as an input, and the corresponding quality grade is used as a label to train a fully connected neural network as a classifier. The training of the neural network is divided into two stages: forward propagation and back propagation. The forward propagation process of the network firstly puts the acoustic absorption-transmission curve features into the input layer, and further extracts the feature by weighted summation of the input and the network weights through the 5-layer fully-connected layer, and finally obtains the probability values of the classified different quality levels through the softmax activation function, and takes the level with the largest probability as the predicted level. The network weights are obtained by back propagation algorithm training, and the loss function uses squared error. The gradient descent method is used to update the weights, and the gradient of the corresponding weights is calculated according to the loss function, and the weights are continuously updated iteratively along the inverse direction of the gradient to minimize the loss function.

In addition, in the neural network model, data enhancement processing is performed to improve the accuracy of liquid detection, which is as follows: the acoustic absorption-transmission curve features obtained from different containers are processed by the frequency-sensitive regularizer and the variational autoencoder to obtain the standard acoustic absorption-transmission curve features of the liquid to be measured. By improving the Variable Auto Encoder (VAE) with a frequency sensitive regularizer and enhancing the acoustic absorption-transmission curve features, the influence of the location, orientation and container shape of the liquid to be measured on the detection results is greatly reduced.

After improving the variational autoencoder (VAE) by means of a frequency-sensitive regularizer, the acoustic absorption-transmission curve features can be automatically generated for different vessel positions.

Based on the observation that acoustic absorption-transmission curve features measured from different locations follow the same distribution, it is possible to generate acoustic absorption-transmission curve features from a small number of manually-measured acoustic absorption-transmission curve features at different locations using a variational autoencoder (VAE). Due to the frequency-selective effect of the acoustic signal, the acoustic absorption-transmission curve features of the same liquid collected from different equipment vessel locations show a particular pattern of variation. As a result, multipath signals caused by differences in different equipment container locations may be enhanced or attenuated at certain frequencies. Based on this key principle, instead of directly applying an existing variational autoencoder (VAEmodel), the variational autoencoder (VAE) is improved in this embodiment by designing a frequency-sensitive regularizer in the loss function of the underlying variational autoencoder (VAE). Enhancement of the acoustic absorption-transmission curve features, this process can effectively improve the detection accuracy against the effects from different equipment vessel locations.

The above method of improving a variational autoencoder (VAE) using a frequency-sensitive regularizer so as to achieve enhancement of the data is specified as follows:

Step S210, extracting acoustic absorption-transmission curve features from different placement locations of the container. For example, an initial location is first selected in the center of the liquid container to place the loudspeaker and microphone for data acquisition. Then, move the loudspeaker-microphone pair up and down and left and right by 1 cm for data acquisition respectively. Ten different pairs of positions are selected for the speaker and microphone. At each position, five acoustic absorption-transmission curve features are extracted.

Step S220: Perform an equivalence check on the acoustic absorption-transmission curve features extracted at the different placement locations, and determine that the acoustic wave signals acquired at the different placement locations for the same liquid have the same distribution of acoustic absorption-transmission curve features. By this step, it is possible to check whether the acoustic wave signals acquired by the same liquid at different placement locations follow the same distribution, and it is experimentally found that even after the container is placed in the detection apparatus, the same liquid has the same distribution of acoustic absorption-transmission curve features when the container is detected at different locations.

Step S230, a data enhancement model is generated, and the data enhancement model generates new acoustic absorption-transmission curve features data after enhancement of the AATC based on the same distribution of the input data. The specific process uses the VAE model to efficiently expand the acoustic absorption-transmission curve features with more data based on a small number of acoustic absorption-transmission curve features that have already been measured. The VAE model consists of an encoder (i.e., Variable Auto-Encoder (VAE)) whose goal is to compress the input feature vectors into a vector of latent variables and decompress the reconstructed inputs of the decoder. The input to the data enhancement model is a vector of acoustic absorption-transmission curve features, which are extracted from manually acquired acoustic signals. The output is the reconstructed acoustic absorption-transmission curve features.

To further improve the performance of the VAE model for data enhancement, a regularization term is added to the loss function of the VAE model based on the monitoring of the acoustic absorption-transmission curve features at different vessel locations. Due to the frequency-selective fading effect of the acoustic signal, the acoustic absorption-transmission curve features at some frequencies experience greater variance at different locations than at other frequencies. Specifically, variations in multipath acoustic signals caused by positional differences can enhance or attenuate the amplitude of the received acoustic signal to a greater extent at some frequencies. By depicting the variance of the acoustic absorption-transmission curve features at all frequencies, the effect of frequency-selective fading on the acoustic absorption-transmission curve features at different locations can be shown. The results show that the acoustic absorption-transmission curve features exhibit a large variance at some frequencies, i.e., frequencies where the variance is higher than the mean of all variances. Thereby indicating that some of the frequencies are more sensitive to different locations, such that some of the frequencies are sensitive frequencies. Since the purpose of using the VAE model is to generate more features of the acoustic absorption-transmission curves obtained at different locations. Therefore, by adding a frequency-sensitive regularizer to the loss function of the VAE model to amplify the variance of the acoustic absorption-transmission curve features of the sensitive frequencies, it is possible to make the generation of more acoustic absorption-transmission curve features at different locations more accurate.

In the above method, after inputting the manually measured acoustic absorption-transmission curve features, the reconstruction loss between the acoustic absorption-transmission curve features as well as the Kullback-Leibler (KL) dispersion are generated, which constitute the loss function of the VAE model. With the added frequency-sensitive regularizer, the variance of the manually measured acoustic absorption-transmission curve features is first calculated for each frequency and the mean of all variances is obtained. Then, frequencies with variance exceeding the mean were selected as sensitive frequencies. The differences between the values of the input acoustic absorption-transmission curve features at these sensitive frequencies were amplified when training the VAE model. Finally, based on a certain number of manually measured acoustic absorption-transmission curve features, the VAE model generates more acoustic absorption-transmission curve features for real liquids, which are combined with the manually measured acoustic absorption-transmission curve features to train the neural network model for liquid detection. The acoustic absorption-transmission curve features processed by the improved variational autoencoder (VAE model) can be used as training data to make the trained neural network model more accurate in the judgment process. Since the enhanced acoustic absorption-transmission curve features eliminate the influence of the position, orientation and container shape of the liquid product on the features, the accuracy of non-invasive liquid detection is greatly improved.

S300, the liquid fingerprint is input into the trained neural network model for detection processing, and the detection results are output.

By extracting the acoustic absorption-transmission curve features and inputting the acoustic absorption-transmission curve features into the neural network model to train the model, a more accurate model can be obtained, and when the received acoustic absorption-transmission curve features are inputted into the trained neural network model, the detection results can be judged directly by the neural network model, thereby greatly improving the detection accuracy.

Embodiment II

Figure 3:
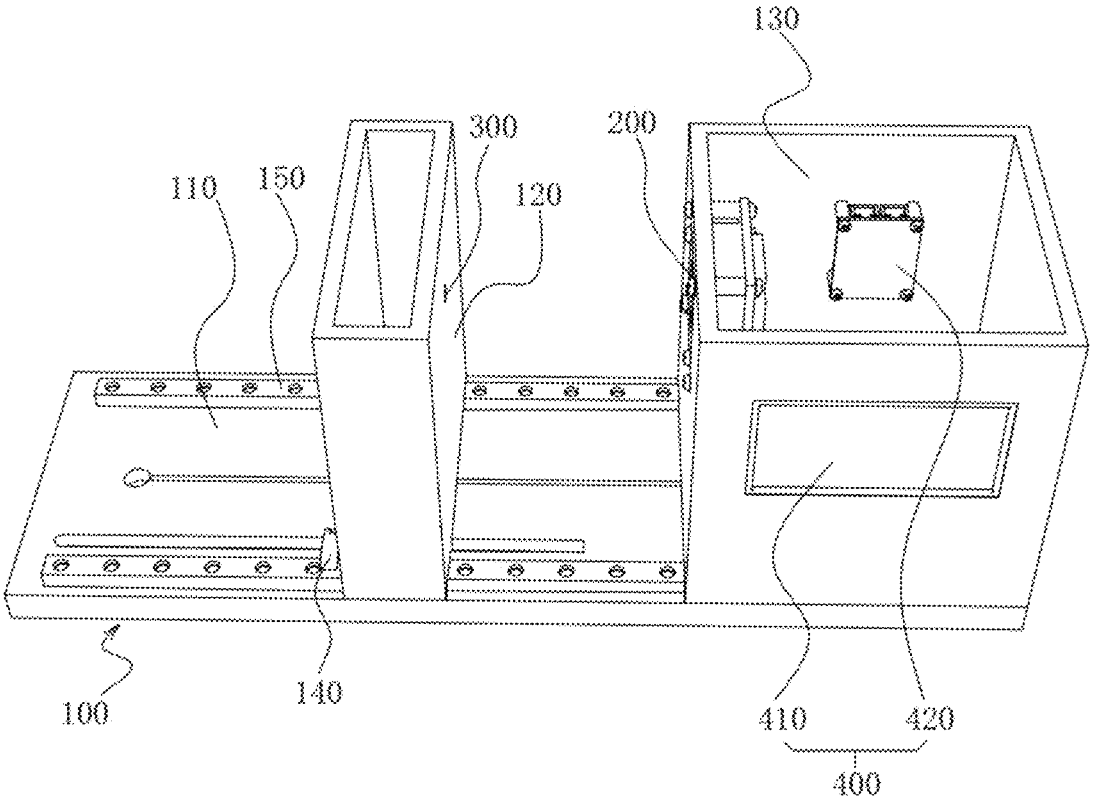
FIG. 3 shows a structural schematic diagram of a non-invasive liquid detection apparatus based on acoustic wave features of the present disclosure.
Figure 4:
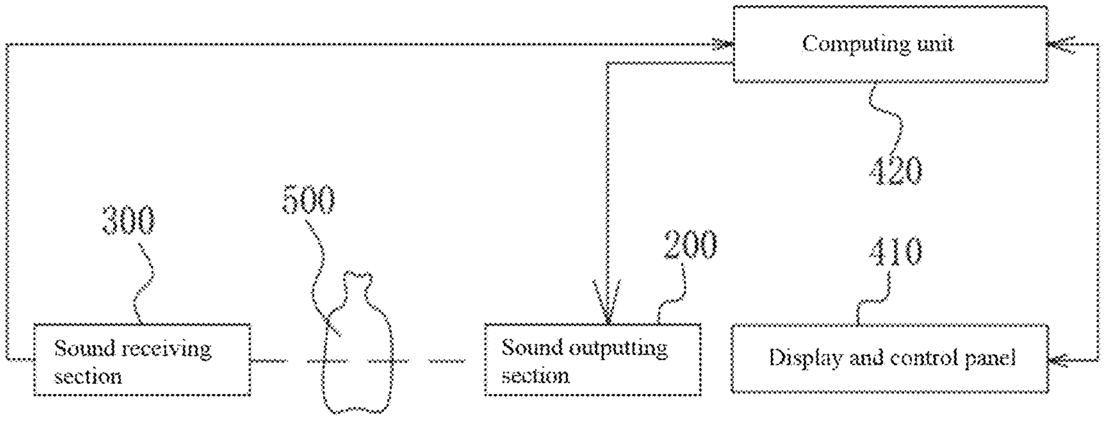
FIG. 4 shows a circuit schematic block diagram of a non-invasive liquid detection apparatus based on acoustic wave features of the present disclosure.

As shown in FIGS. 3 and 4, a non-invasive liquid detection apparatus based on acoustic wave features is proposed in this embodiment, which mainly comprises: a base 100, a sound outputting section 200, a sound receiving section 300, and a control computing component 400. the base 100 may be placed on a desktop or on a floor, which mainly provides a mounting and supporting location for each apparatus. The sound outputting section 200 may be a speaker, which is provided on the base 100 and is used to emit sound. The sound receiving section 300 may be a microphone which is provided on the base 100 and is provided in opposition to the sound outputting section 200. The sound receiving section 300 and the sound outputting section 200 are provided for placing a container 500 containing a liquid to be measured between them, and the sound receiving section 300 may receive sound waves after penetrating the liquid to be measured. The control computing component 400 is electrically connected to the sound outputting section 200 as well as the sound receiving section 300 and is used to perform a non-invasive liquid detection method based on acoustic wave characterization as described in Example 1 above.

The non-invasive liquid detection apparatus comprising four parts, namely, the base 100, the sound output part 200, the sound receiving part 300, and the control calculation component 400, not only realizes non-destructive and high-precision detection of liquids, but also has a compact size, low cost of accessories, and is easy to commercialize and promote.

The base 100 of this embodiment specifically includes: a base plate 110, a movable section 120, a fixed section 130, and an adjustment limit member 140. the base plate 110 is horizontally extended (in the left and right directions), and a threading groove is provided on the base plate 110 for installing a cable. A slider rail assembly 150 is provided on the base plate 110, wherein the rail is provided extending in the left-right direction, and the slider is slidably connected to the rail. The movable section 120 may adopt a stopper, which is provided on the base plate 110 by the slider guide assembly 150 moving in a first predetermined direction (left-right direction), and the sound outputting section 200 is fixedly connected to the movable section 120. The fixed section 130 may adopt a fixed housing, which is fixedly provided on the base plate 110 and spaced apart from the movable section 120, the movable section 120 being moved closer to or farther away from the fixed section 130 by movement, and the sound receiving section 300 being provided on the fixed section 130, the adjustment limit member 140 may be a fixed clip and is used to fix the movable section 120 after the adjusting of the position, and when the movable section 120 has been adjusted to the suitable position, the movable section 120 is secured by the adjustment limit member 140, thereby locking the movable section 120. It is easy to think that it is also possible that the sound outputting section 200 is fixedly connected to the fixed section 130 and the sound receiving section 300 is fixedly connected to the movable section 120.

The control computing component 400 in this embodiment includes: a display and control panel 410 and a computing unit 420, the display and control panel 410 is provided on the base 100, specifically the display and control panel 410 adopts a touch screen and can be provided on the fixed section 130, so as to be conveniently used for sending control commands through the touch screen, such as detection of the authenticity of the liquid, the type of the liquid and the liquid quality; the touch screen can also directly display the detection results; the touch screen can also directly display the detection results. detection; the touch screen may also directly display the results of the detection. The computing unit 420 is provided on the base 100 and is electrically connected to the display and control panel 410; specifically, the computing unit 420 may be a Raspberry Pi, through which data reception, processing, storage, and transmission are realized. The Raspberry Pi is provided with a software program, which is used to implement the non-invasive liquid detection method based on acoustic wave features in the above-described embodiment I.

Principle of operation: the base 100 is an adjustable platform capable of securing a container 500 containing a liquid to be measured. The base is equipped with a 3D printed slide rail assembly and a baffle plate, and the position of the baffle plate can be adjusted left or right within the slide rail to accommodate different shapes of containers 500 containing liquids to be measured. After the adjustment is completed, the baffle plate is secured using a retaining clip. Thereby, the container 500 containing the liquid to be tested is secured between the speaker and the microphone by the baffle plate, the speaker being used to emit sound towards the container 500 containing the liquid to be tested, and the microphone being used to pick up acoustic wave features penetrating the container 500 being filled with the liquid to be tested. The microphone and the loudspeaker are positioned opposite each other and at the same level. The microphone and the speaker are connected to the Raspberry Pi via data lines. The received acoustic wave signals are transmitted to the Raspberry Pi for data processing, and the Raspberry Pi specifically includes a feature extraction unit and a liquid quality determination unit for performing acoustic wave features extraction and liquid quality determination. Among them, the feature extraction unit processes the collected acoustic wave by means of a signal processing algorithm to exclude problems caused by multipath propagation of the acoustic wave, to remove noise signals, and to extract acoustic absorption and transmission curve features to generate a liquid fingerprint. The liquid quality determination unit performs liquid quality determination by means of a neural network model. The neural network model is optimized by a data enhancement algorithm, and a variety of liquid counterfeit samples are collected to expand the sample database to improve the accuracy. The display and control panel 410 is used to operate the detection apparatus and display the detection results. The display and control panel 410 is mounted on the front of the apparatus base 100 and is connected to the Raspberry Pi via a data cable. Different test results are displayed depending on the test item selected on the display and control panel 410.

In summary, the present disclosure proposes a non-invasive liquid detection method based on acoustic wave features as well as an apparatus, based on the principle that liquids of different compositions have different acoustic impedances and acoustic signal absorption rates, and generates a liquid fingerprint by emitting and collecting acoustic waves penetrating a liquid container, and extracting acoustic absorption-transmission curve features from the received acoustic waves. By comparing the measured liquid fingerprints with the fingerprints of various types of liquids in the database, the quality of the measured liquid can be easily and quickly recognized without contacting the liquid. At the same time, the present solution is able to adapt to liquid goods in various material containers and different shape containers to realize more efficient and more accurate detection. The present application addresses the accuracy problem of non-invasive liquid quality detection, and greatly improves the detection accuracy through wireless sensing and neural network modeling. The neural network model is generated through sound feature preprocessing and feature extraction, and a large number of sound wave features of liquid products are collected for expanding the sample database. The data enhancement algorithm greatly reduces the influence of the location and orientation of the tested liquid product and the shape of the container and the material of the container on the detection results, thereby greatly improving the accuracy of non-invasive liquid detection. The present application adopts a low-cost standardized commercial loudspeaker to emit sound and a microphone to collect sound waves, which can realize the quality detection of liquids, and the apparatus is compact in size, with low cost of accessories, and easy to commercialize and promote.

It should be understood that the application of the present disclosure is not limited to the above-described examples, and may be improved or transformed according to the above-described description for a person of ordinary skill in the art, and all such improvements and transformations shall fall within the scope of protection of the appended claims of the present disclosure.

What is claimed is:

1. A non-invasive liquid detection apparatus based on acoustic wave features, comprising: a base, the base including:

a base plate;

a movable section, the movable section is movably provided on the base plate in a first predetermined direction by a slide guide assembly, a sound receiving section is provided on the movable section;

a fixed section, the fixed section is fixedly provided on the base plate and spaced apart from the movable section, a sound outputting section is provided on the fixed section; and an adjustment limit member configured to fix the movable section after position adjustment;

the sound outputting section provided on the base for emitting sound;

the sound receiving section provided on the base and set opposite the sound outputting section, between the sound receiving section and the sound outputting section a liquid to be tested is placed, the sound receiving section is configured to receive sound waves penetrating the liquid to be tested; and a control computing component, the control computing component electrically connected to the sound outputting section and the sound receiving section, and configured to:

collect acoustic waves penetrating a liquid to be tested, and extract acoustic absorption-transmission curve features from the acoustic waves to generate a liquid fingerprint, wherein the acoustic absorption-transmission curve features represent a ratio of an energy of an acoustic signal penetrating the liquid to an energy of an acoustic signal emitted across a plurality of frequencies; and input the liquid fingerprint into a trained neural network model for detection processing, and output detection results, wherein the trained neural network model is trained with a plurality of sets of data, each of the plurality of sets of data comprises: acoustic absorption-transmission curve features and a label identifying a feature in the acoustic absorption-transmission curve features meeting a detection requirement.

2. The non-invasive liquid detection apparatus based on acoustic wave features according to claim 1, wherein the control computing component comprises:

a display and control panel, the display and control panel is provided on the base;

a computing unit, the computing unit is provided on the base and electrically connected to the display and control panel.

3. The non-invasive liquid detection apparatus according to claim 1, wherein the control computing component is further configured to:

collect acoustic waves penetrating the liquid to be tested and pre-processing the acoustic waves to obtain an acoustic wave signal with background noise removed;

perform a fast Fourier transform on the processed acoustic wave signal and extracting a frequency domain amplitude at each frequency; and divide the frequency domain amplitude by a corresponding amplitude in a spectrum to obtain the acoustic absorption-transmission curve features.

4. The non-invasive liquid detection apparatus according to claim 3, wherein the control computing component is further configured to:

pre-process the collected acoustic waves by a high-pass filter with a cutoff frequency of 18 kHz to remove the background noise.

5. The non-invasive liquid detection apparatus according to claim 3, wherein before performing a fast Fourier transform on the processed acoustic wave signals and extracting a frequency domain amplitude at each frequency, the control computing component is further configured to:

process the acoustic wave signal with background noise removed by a hamming window function.

6. The non-invasive liquid detection apparatus according to claim 3, wherein in the neural network model, the acoustic absorption-transmission curve features obtained in different containers are processed by a frequency-sensitive regularizer and a variational auto-encoder, to obtain a standard acoustic absorption-transmission curve feature of the liquid to be tested.

7. The non-invasive liquid detection apparatus according to claim 6, wherein the neural network model comprises a 5-layer fully connected neural network having 32 neurons in each layer of the neural network.

8. The non-invasive liquid detection apparatus according to claim 1, wherein before inputting the liquid fingerprint into a trained neural network model for detection processing, and outputting detection results, the control computing component is further configured to:

select a corresponding neural network model according to a received detection instruction;

wherein the detection instruction comprises verifying an authenticity of liquor;

each set of data for training the neural network model comprises: acoustic absorption-transmission curve features, and a label identifying a feature in the acoustic absorption-transmission curve features related to the liquor is genuine;

or the detecting instruction comprises detecting a category of liquid;

each set of data for training the neural network model comprises: acoustic absorption-transmission curve features, and a label identifying the category of liquid in the acoustic absorption-transmission curve features;

or the detecting instruction comprises detecting a quality of liquid;

each set of data for training the neural network model comprises: acoustic absorption-transmission curve features, and a label identifying the quality of liquid in that acoustic absorption-transmission curve features.

* * * * *